Aug. 23, 1932.  W. A. MULHERN  1,872,788
LUBRICANT SEAL
Filed Sept. 14, 1928

INVENTOR
WILLIAM A. MULHERN.
BY
ATTORNEY

Patented Aug. 23, 1932

1,872,788

UNITED STATES PATENT OFFICE

WILLIAM A. MULHERN, OF DETROIT, MICHIGAN, ASSIGNOR TO CHRYSLER CORPORATION, OF DETROIT, MICHIGAN, A CORPORATION OF DELAWARE

LUBRICANT SEAL

Application filed September 14, 1928. Serial No. 306,102.

This invention relates to a lubricant seal and more particularly to a sealing device between the outer end of an automobile axle and the wheel hub.

When a felt or leather washer is used as a sealing means between the wheel hub and the outer end of the rear axle it is important that the washer is held from rotating with the hub. This is particularly true when some means has been provided for resiliently urging the inner periphery of the washer against the outer periphery of the hub. It is therefore an object of this invention to resiliently urge the sealing washer against the hub and to provide other means for holding the washer from rotating with respect to the axle housing.

Another object of the invention is to provide a means for holding the washer against rotation with respect to the axle housing which permits radial movement of the washer so that the washer and the hub are in alignment.

Other objects and advantages of the invention will more fully appear from the following description taken in connection with the accompanying drawing in which.

Figure 1:
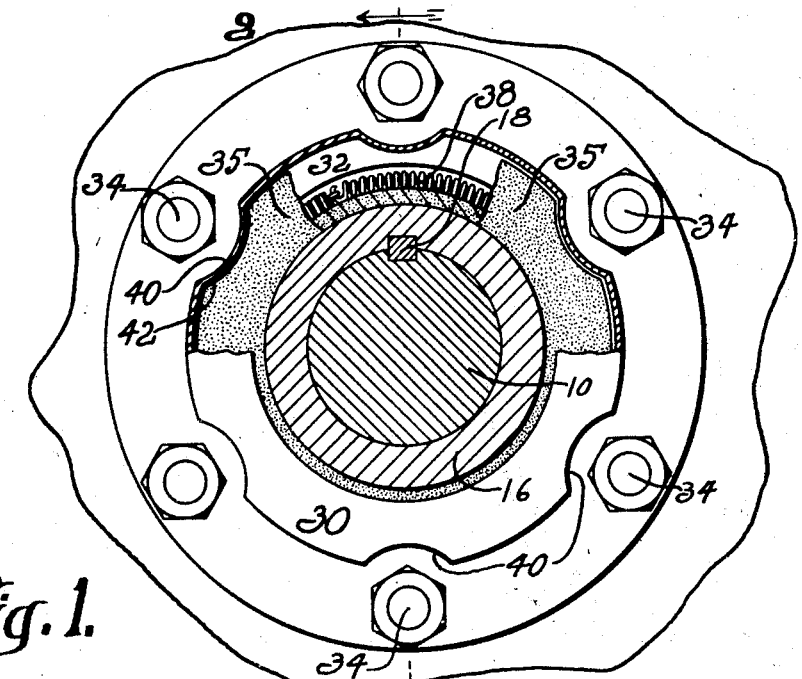
Fig. 1 is an end view of an automobile rear axle and its housing, parts being broken away and in section.
Figure 2:
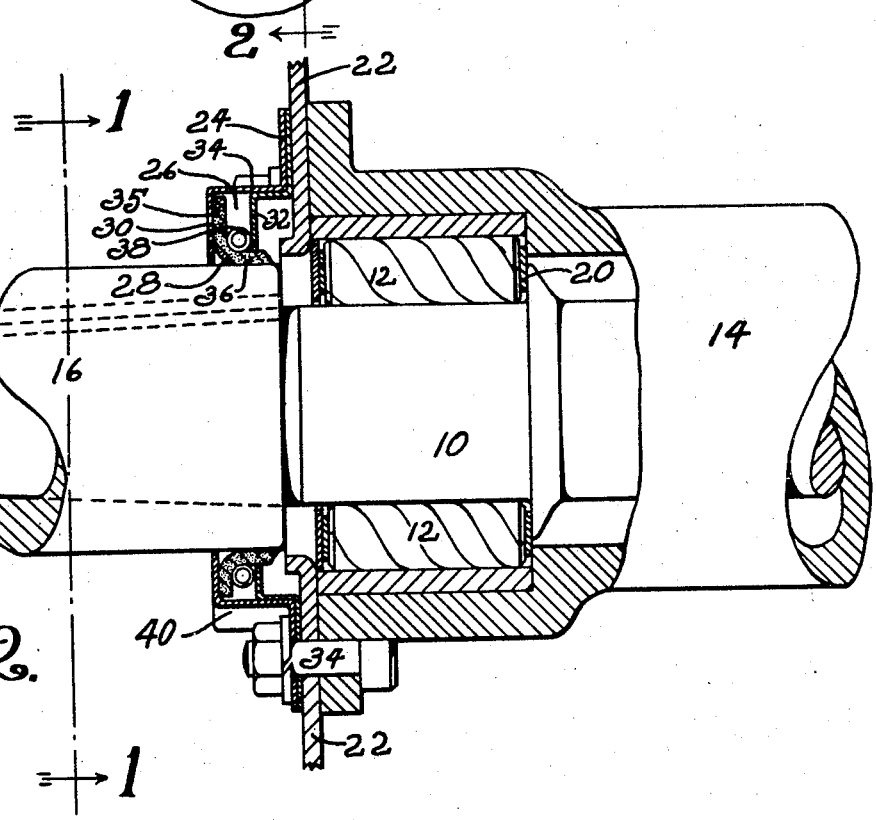
Fig. 2 is a longitudinal sectional view of the axle taken on line 2—2 of Fig. 1, parts being shown in elevation.

Referring to the drawing, I have shown a rear axle 10 journaled in a bearing 12 in an axle housing 14. A portion of a wheel hub 16 is shown on the tapered end of the axle 10 keyed thereto as at 18.

The bearing 12 is held against axial movement in one direction with respect to the housing 14 by a shoulder 20 and in the other direction by a brake drum cover 22 bolted or otherwise secured to the outer end of the housing 14.

To retain the lubricant within the axle housing 14 and to prevent it from being thrown on the wheel or brake lining I have provided a novel sealing means carried by the axle housing and within which the wheel hub rotates. The sealing device comprises a packing retaining part 24 having an annular channel 26 adapted to receive a suitable packing or gasket 28. The part 24 as shown is formed from a pair of stampings, one stamping having a flange 30 forming the outer wall of the channel 26 and the other stamping having a flange 32 forming the inner wall of the channel 26. Both stampings are secured to the housing by the same bolts 34 which secure the brake drum cover 22 on the outer end of the housing 14.

The packing in the form of the device illustrated is preferably made of leather and is formed annular in side elevation and L shaped in cross section; that is, the packing has a radially extending flange 35 and an axially extending flange 36. The inner periphery of the flange 36 engages the outer periphery of the wheel hub 16. A coil spring 38 having its opposite ends secured together to form an annular resilient ring is placed around the outer periphery of the flange 36 urging the latter in frictional engagement with the hub 16. The spring 38 also urges the flange 35 against the outer flange 30.

As a means for preventing rotation of the packing with the hub due to the frictional engagement, I have provided a plurality of indentations 40 in the part 24, preferably at the base of the channel 26. The flange 35 of the packing 28 is notched out as at 42 to receive the indentations. It will be understood that by depressing a portion of the part 24 into the packing 28 the latter is held against rotation with the hub and that by positioning the indentations adjacent the bolts 34 sufficient room is provided for a wrench to be placed on the heads. Clearance has been provided between the outer perimeter of the flange 35 and the inner perimeter of the base of the channel 26 so that the packing 28 is free for radial movement to compensate for any misalignment of the axle housing or the packing retaining member with respect to the wheel hub.

It will be obvious that various changes including the size and arrangement of parts may be made without departing from the spirit of my invention and it is not my intention to limit its scope other than by the terms of the appended claims.

What I claim is:

1. A lubricant sealing device comprising a packing retaining member having an annular channel extending in a radial plane, arcuate depressed portions at the base of said channel, a packing member in said channel and having arcuate recessed portions which receive said arcuate depressed portions, a flange on said packing extending over the open edge of said channel, and resilient means within said channel adapted to urge said flange radially.

2. A lubricant sealing device comprising a packing ring having an annular radial flange, the outer periphery of said radial flange having cut out portions, and a retaining member for said packing, having depressed portions adapted to engage the cut out portions on said radial flange.

3. A lubricant sealing device comprising a packing ring having a radially extending portion, the outer periphery of said radially extending portion having cut out portions, and a closed retaining member for said packing having closed depressed portions adapted to engage the cut out portions of said radially extending portion.

WILLIAM A. MULHERN.